United States Patent Office 3,285,763
Patented Nov. 15, 1966

3,285,763
PLASTIC REFRACTORY COMPOSITIONS
Louis J. Jacobs, Chicago, Ill., assignor to The S. Obermayer Co., Chicago, Ill., a corporation of Ohio
No Drawing. Filed Nov. 5, 1964, Ser. No. 409,297
11 Claims. (Cl. 106—67)

This invention relates to plastic refractory compositions and to their methods of manufacture. More particularly, this invention pertains to improved plastic refractory compositions which are rammed or compacted in place to form walls, floors, and roofs as monoliths in metallurgical furnaces or the like.

The present invention constitutes an improvement over a plastic refractory composition disclosed in U.S. Patent No. 2,949,704, and the entire disclosure of that patent is hereby specifically incorporated herein by reference, except insofar as that disclosure may be inconsistent with the instant disclosure. It is the aim of the present invention to provide plastic refractory compositions which have increased green strength to hold and maintain the plastic walls in place prior to drying and firing, and which have improved hot load-bearing properties without impairment of the over-all quality of the composition and without affecting adversely other properties of the refractory material.

It is a principal object of the invention to provide a plastic refractory composition convertible, upon firing, to an improved refractory of extremely low deformation under load at operating temperatures.

Another object of the invention is to provide a plastic refractory composition having increased strength at low temperatures and during drying periods.

Still another object of the invention is to provide a plastic refractory composition producing a refractory having an unusually low thermal spalling loss.

Additional objects and aims of the invention include the following:

To provide a plastic refractory composition which gives rise to refractories having low coefficients of thermal expansion;

To provide a plastic refractory composition having low thermal conductivity;

To provide plastic refractory compositions convertible to monolithic structures such as linings for furnace chambers, ducts and the like, these linings being substantially inert to oxidizing agents, reducing atmospheres and/or corrosive chemical agents;

To provide a simple, low-cost, yet highly effective procedure for upgrading refractory compositions currently in use.

The above and further objects, aims and advantages of the invention are achieved, in accordance with the practice of the present invention, by applying a coating to the aggregate which constitutes the principal component of the composition. The nature of this coating and the method of its application will be understood from the following description.

As has been pointed out above, the present invention is an improvement of a refractory composition (refractory B) described in U.S. Patent No. 2,949,704. While the invention has particular application and utility with respect to that composition, the principles and the inventive concept involved are generally applicable to other formulations and are not to be limited except as such limitations exist in the appended claims. For the purposes of illustrative disclosure, the invention will be described with reference to a particular composition. It is to be understood, however, that in the light of the present disclosure those skilled in the art will be able to apply the invention to other compositions as well, without exercise of the inventive faculty.

A typical plastic refractory composition, without the alumina coating but of the type in which the present invention finds utility, is the following:

TABLE I

| | Preferred Concentrations | Suitable Ranges |
|---|---|---|
| Calcined flint clay (about 3 to 10 mesh) | 61.4 | 50–70 |
| Raw kyanite (about 20 to 50 mesh) | 11.3 | 5–15 |
| Bond clay | 13.7 | 10–20 |
| Plastic bond clay | 4.5 | 2–7 |
| Water | 9.1 | 7.75–11.0 |

All concentrations listed are parts by weight.

The role or function of each of the several components of the above compositions and the coating used in combination therewith will be indicated briefly in the paragraphs below. A more complete discussion of the basic composition may be found in the above referred to U.S. Patent No. 2,949,704.

The calcined flint clay in the above formulation is a hard fire clay which occurs as an unstratified massive rock. This material is practically devoid of natural plasticity and shows a conchoidal fracture. It is calcined to eliminate shrinkage, and is then crushed to the size of between about 3 mesh and 10 mesh.

The kyanite used in the compostion of Table I may be a crushed raw Virginia kyanite or aluminum silicate in the range of about 20 to about 50 mesh size and consisting of approximately 63% alumina and approximately 37% silica by weight. Upon heating, the kyanite is converted to mullite and a siliceous glass.

Various plastic kaolinite fire clays and plastic ball clays such as Tennessee or Kentucky ball clays may be used in the composition. These are readily available commercially and are well-known to thse skilled in the art. The plastic bond clay may be a plastic montmorillite fire clay.

In the usual preparation of the plastic mass, sufficient water is added to the other ingredients to obtain a moldable mass. A typical chemical composition of the resulting base plastic refractory without the alumina coating, is the following:

TABLE II

Parts by weight
(calcined basis)
Alumina _____ 42.93
Silica _____ 51.62
Ferric oxide _____ 1.35
Titania _____ 2.20
Calcium oxide _____ 0.31
Magnesium oxide _____ 0.27
Alkalies _____ 0.78

The esscene of the instant invention is in coating the flint clay of the composition set forth in Table I and Table II with calcined alumina. In a preferred procedure the alumina is applied as an aqueous slurry having the following typical composition:

TABLE III

| | Typical Concentration | Suitable Ranges |
|---|---|---|
| Calcined alumina | 99 | 90–99.5 |
| Bonding or suspending agent | 1 | 0.5–10 |
| Wetting agent | 0.02 | 0.01–0.5 |

All concentrations, parts by weight.

In a preferred coating composition the alumina is 325 mesh, bentonite clay is used as the bonding agent, and "Aerosol OT" (sodium dioctyl sulfosuccinate) is used as the wetting agent. In this specific example the slurry consists of about 40% water and 54% solids and is effective to provide uniform coverage of the alumina on the raw flint fire clay. A detailed typical coating procedure includes the following steps:

(1) Crushing the raw flint clay to the desired size, preferably about 3 mesh,
(2) Coating the crushed and sized flint clay with a slurry containing the calcined alumina,
(3) Drying the alumina-coated raw crushed and sized flint clay,
(4) Calculating the dry coated raw flint clay,
(5) Screening the coated calcined clay, and
(6) Charging the screened calcinated coated clay into a mixer with the other ingredients (kyanite, bond clay, and water) to provide a plastic refractory composition.

The final product is packaged as slabs in polyethylene bags, each slab being about 2½ x 9 x 11 inches and weighing about 20 pounds. Five slabs are packaged per carton and these are shipped to the site of use. At the job site the slabs of plastic refractory are removed from the moisture-tight bags, placed in the furnace wall, and compacted by means of pneumatic rammer to form the wall, floor, and roof of the furnace structure. Fuel is supped and the overall monolithic structure is brought up to operating temperature to provide an integral assembly of increased physical strength, low spalling loss, and low thermal conductivity.

Any preferred specific procedure may be used in applying the alumina coating to the raw flint clay. For example, the crushed clay may be placed in an elevating basket, immersed in the alumina slurry, and then withdrawn and the coated product transferred to a drying area. The dried coated product is then discharged into a rotary or other type of continuous calcining kiln, the waste heat from which may be used to dry the alumina slurry on the crushed clay. Alternatively, coating may be by means of a pelletizing and mixing disc and the coated product then discharged into a continuous calcining kiln. After calcining, the alumina coated flint clay is sized and charged into a Muller-type mixer with the other ingredients. In a preferred procedure, mixing is carried out just long enough to produce a plastic homogeneous mass.

In preparing slurries of the alumina, binding agents other than bentonite clay may be used. Suitable alternative materials include the lower alkyl celluloses, methyl cellulose, ethyl, propyl and butyl cellulose. Also suitable are lignin type resinous material. When using the lower alkyl celluloses, it is desirable to include a small quantity of an anti-fermenting agent such as formaldehyde derivatives or hydrogen peroxide.

Many types of surface active agents or wetting agents may be incorporated in the coating slurry to facilitate wetting of the flint clay surface. These surface active agents are preferably low-foaming, suitable compositions including non-ionic, cationic, and anionic materials. The non-ionic surface active agents may be condensation products of ethylene oxide with ionic materials. The non-ionic surface active agents may be condensation products of ethylene oxides with alkyl phenols, condensation products of ethylene oxide with long chain alkyl mercaptans such as dodecyl mercaptan, or may be polyethylene glycol fatty acid esters. The cationic agents include quaternary ammonium salts such as cetyl pyridinium bromide and cetyl trimethyl ammonium bromide. Anionic surface active agents which may be used in conjunction with the non-ionic surface active agents, in order to regulate and to control the viscosity of the slurry, include alkyl aryl sulphonates such as sodium dodecylbenzene sulphonate, the salts of alkyl hydrogen sulphates such as sodium lauryl sulphate and sodium cetyl sulphate, and the alkyl sulfosuccinates such as sodium dioctylsulfosuccinate. In the light of the teachings of the instant invention, those skilled in the art will be able to select other preferred thickening or suspending agents and wetting agents.

Application of the alumina coating to the raw flint clay will increase the weight of the latter from about one to about 8 percent depending upon the size and shape of the particular flint clay particles. An average increase is in the range of about 3 to 4% of the weight of the raw flint clay. Upon calcining the alumina coated product, the increase in weight of the flint clay is converted to a range of about 4 to 5%, there being a weight loss of approximately 20% in the raw flint clay upon calcining. A comparison of the chemical analyses of the calcined flint clay and of the alumina coated calcined flint clay is provided below:

| Chemical Ingredients | Uncoated calcined flint clay | Coated calcined flint clay |
|---|---|---|
| Silica | 51.79 | 48.93 |
| Alumina | 44.27 | 47.30 |
| Titania | 2.67 | 2.56 |
| Ferric oxide | 0.73 | 0.70 |
| Calcium oxide | 0.05 | 0.05 |
| Magnesium oxide | 0.11 | 0.10 |
| Alkalies | 0.38 | 0.36 |

All concentrations, parts by weight.

While from a purely mathematical comparison it may seem that the differences in the percentage compositions are reltaively insignificant, such a superficial comparison overlooks the fact that the important feature of the invention is the provision of an alumina coating on the surface of the flint clay. At this surface the alumina content or concentration for the coated product is in the region of about 80 to about 90%. The sintered alumina which coats the flint clay is uniquely available for reaction with the bond clay as the furnace is heated to operating temperatures to provide the improved refractory of the invention. The general nature of the several reactions and transformations believed to be involved are described in the paragraphs below.

As the temperature of the plastic refractory composition is increased in situ in the furnace, the amount of glass formed by the bond clay (which is the least refractory constituent of the plastic mass) increases and the glass becomes more fluid. At the same time, the glass in the sintered clay begins to react with the alumina-coated flint clay and becomes less fluid or more adhesive. That is, the glass in the bond clay reacts with the mullite (aluminum silicate) to provide increased viscosity as the temperature is raised. The excess silica of the bond clay reacts with the corundum (aluminum oxide or alumina) on the surface of the coated flint clay to form mullite (aluminum silicate). As the reactions proceed still further, the amount of liquid glass decreases and its viscosity increases. Consequently, the deformation under load at operating temperature is decreased.

It has been the practice in the prior art, in fabricating plastic refractory composition, to add finely divided alumina to the bond clay. This is markedly different from the instant procedure and the advantages of the subject invention are not achieved through practice of the prior art methods. Since the effect of the addition of alumina to the bond clay is to increase the surface area which must be bonded by the clay, the low temperature strength of the resulting plastic composition is significantly reduced. In marked contrast, an outstanding and unexpected advantage of the improved composition and method of the invention is that there is achieved low deformation under hot load without reduction in strength at low temperatures. The following typical data provide a comparison of the improved product of the invention with a regular plastic refractory (Refractory B of Patent No. 2,949,704) and with a regular plastic refractory in which minus 325 mesh alumina has been added to the bond clay. The data tabulated below provide information pertaining to the hot load deformation (Table IV) as well as to transverse strength values after heating the plastic refractory composition to various temperatures (Table V).

TABLE IV.—HOT LOAD DEFORMATION

Product with alumina coated flint clay _____ 4.3%
High quality prior art product _____ 6.8%
High quality prior art product with 325 mesh alumina added to bond clay _____ 5.5%

The hot load deformation values, recorded above in Table IV were obtained in accordance with A.S.T.M. Test Method C-16-62, heated as per Schedule 3. In this particular test, the specimen is subjected to a load of 25 pounds per square inch and is heated to 2640° F. in four hours and held at that temperature for 90 minutes.

Table V includes data relating to the transverse strength of refractory compositions of the invention as compared with prior art structures. The values recorded pertain to transverse strength at room temperature after heating at the various designated temperatures.

TABLE V.—TRANSVERSE STRENGTH AFTER HEATING AT VARIOUS TEMPERATURES

| T. (° F.) | Product of Invention, p.s.i. | High quality Prior Art Composition, p.s.i. | High quality prior art composition with added alumina incorporated with the bond clay, p.s.i. |
| --- | --- | --- | --- |
| 230 | 110 | 110 | 85 |
| 1,500 | 160 | 155 | 95 |
| 2,550 | 480 | 510 | 320 |
| 2,900 | 500 | 670 | 690 |
| 3,000 | 695 | 1,020 | 925 |

The transverse strength or modulus of rupture values listed in Table V were obtained using A.S.T.M. standard Test Methods C179-46 and C133-55. The outstanding feature that these data bring out is that the refractory composition of the invention provides low deformation under load at high operating temperatures without sacrificing strength at low temperatures. It is believed that the mechanism by which the improved properties of the refractories of the invention are achieved involve several different reactions and interactions of the components of the plastic composition. That is, the alumina component of the flint clay reacts with the silica present to form mullite, and the excess silica near the surface of the flint clay reacts with the alumina coating to form mullite with some pure alumina interspersed between the mullite crystals on the surface of the flint clay.

The bond clay begins to sinter at about 1200° F. and it is this sintering of the bond clay which helps to produce the strength of the refractory. Maximum strength is obtained if the aggregate is graded to give maximum density mixtures, since under these conditions, the shrinkage of the bond clay is minimal. On the other hand, increase in the surface areas to be bonded by the bond clay, as by the prior art addition of alumina, causes a decrease in the overall strength of the final products. Such an effect is noted if finely divided alumina is merely added to or mixed with the bond clay.

As the temperature of the plastic refractory is raised, the amount of glass formed by the bond clay (which is the last refractory constituent of the plastic composition) increases, and the viscosity of the glass decreases. At the same time the glass in the sintered clay begins to react with the coated flint clay, to increase the viscosity of the glass. The glass in the bond clay reacts first with the mullite to increase the viscosity as the temperature is raised and the excess silica in the bond clay also reacts with the corundum on the surface of the coated flint clay to form mullite. As the reaction proceeds further, the amount of liquid glass decreases and the viscosity of the glass increases to provide decreased deformation under load. Since the mullite and corundum coating on the flint clay is more reactive than is the finely divided alumina mixed with the bond clay, the mullite and the corundum react with the glass more readily. This fact is apparent from a consideration of the transverse strength values in the region of 3,000° F.

It is apparent from the data of Table V that there is no appreciable difference in the modulus of rupture of the improved composition of the invention as compared with the uncoated regular material. While the composition which contains fine alumina in the bond clay is lower in strength, this effect is believed to be due to the increased surface of the fine alumina which causes effective dilution of the bond clay. The effect described is the same as 1500° F. and at 2550° F.

The modulus of rupture or transverse strength, which is determined at room temperature on specimens which have been fired at 2900° F. and at 3,000° F., is a measure of the extent of fusion or glass formation, the higher the degree of fusion of the refractory, the greater the strength. The data of Table V further indicate that the composition of the invention has lower strength at 2900° F. and at 3,000° F. than does the regular prior art composition. The refractory containing the fine alumina has a higher strength at 2900° F. and this is believed to be due to the fact that the alumina is not as reactive as the alumina coating which has reacted with the calcined flint clay surface. At 3,000° F., however, the alumina has reacted with some of the glass, as indicated by the relatively decreased strength.

As has been pointed out, the high load bearing quality of the compositions of the invention is a most important property of the refractory material obtained. In addition to this greater load bearing capacity, the improved plastic refractory of the invention has decreased thermal spalling loss. This particular test is conducted by heating a test panel of the refractory composition for a period of 24 hours at 3,000° F. The panel is then cooled and again heated but to 2550° F. in 10 minutes. The refractory at 2550° F. is cooled in 10 minutes with an air water mist blast to complete a cycle of the test procedure. The entire test consists of 12 such cycles of heating and cooling. The refractories of the invention do not spall or fracture when subjected to these tests; they are unusually strong and effectively withstand both thermal and mechanical shock. These refractories are particularly suitable for furnace linings in such structures as reverberatory furnaces for melting aluminum, for iron and steel forming furnaces, as linings for hot gas chambers, doors and ducts, and related uses.

The term "consisting essentially of" as used in the definition of the ingredients present in the composition claims is intended to exclude the presence of other materials in such amounts as to interfere substantially with the properties and characteristics possessed by the compositions set forth, but to permit the presence of other materials in such amounts as not substantially to affect the properties and characteristics adversely therein.

In the light of the present disclosure and teachings, one skilled in the art will know or be able to deduce with confidence the applicability of other known materials finding utility in the practice of the invention. It is, therefore, intended that the present embodiments be considered in all respects as illustrative and not restrictive. To the extent that changes and modifications are within the scope of the appended claims, they are to be considered to be a part of this invention.

What is claimed is:

1. A plastic refractory compostion consisting essentially of a homogeneous mixture of alumina-coated flint clay, kyanite, bond clay, and water typified by the following approximate proportions in parts by weight:

| | |
|---|---|
| Alumina-coated flint clay | 50.5–75.6 |
| Kyanite | 5–15 |
| Bond clay | 12–27 |
| Water | 7¾–11 |

2. The composition of claim 1 wherein said alumina-coated flint clay consists essentially of between about 50 and about 70 parts by weight of flint clay and between about 1 and about 8 percent by weight of calcined alumina based on the weight of flint clay and applied as a coating thereto.

3. In a plastic refractory composition consisting essentially of a homogeneous mixture of from about 50 to about 70 parts by weight of flint clay of between about 3 and about 10 mesh size, about 5 to about 15 parts by weight of kyanite of between about 20 and about 50 mesh size, about 12 to about 27 parts by weight of bond clay; the improvement which consists essentially of finely divided calcined alumina distributed as a substantially uniform coating on particles of said flint clay, and means bonding said alumina to said particles of said flint clay.

4. The improvement as set forth in claim 3 and further comprising a surface active chemical agent effective to promote wetting of surfaces of said particles of said flint clay to facilitate application of said alumina and said bonding means to said flint clay particles.

5. In the method of manufacturing a plastic refractory composition and comprising preparing a homogeneous mixture of about 50 to about 70 parts by weight of flint clay, about 5 to about 15 parts by weight of kyanite, about 12 to about 27 parts by weight of bond clay, and sufficient water to obtain a moldable mass; the improvement which consists essentially of applying substantially uniformly over the surface of said flint clay in its raw state, a coating of calcined alumina in an amount in the range of about 1 to about 8 percent by weight based on the weight of said flint clay, and calcining the alumina coated flint clay prior to mixing with other components of said compostion.

6. The method of manufacturing a plastic refractory composition comprising:
coating about 50 to about 70 parts by weight of raw flint clay with an aqueous slurry consisting essentially of from about 1 to about 8 percent by weight of calcined alumina based on the weight of said flint clay, a bonding agent in an amount effective to facilitate adhering said alumina to said flint clay, and a surface active agent in a small amount but in an amount effective to promote wetting of surfaces of particles of said flint clay;
drying and calcining the alumina-coated flint clay;
mixing the calcined alumina-coated flint clay with from about 5 to about 15 parts by weight of aluminium, silicate, about 12 to about 27 parts by weight of bond clay, and
adding water in an amount sufficient to provide a moldable mass, said moldable mass adapted upon firing to convert to a high temperature refractory having a low thermal coefficient and high load bearing properties.

7. In a plastic refractory composition consisting essentially of from about 50 to about 70 parts by weight of flint clay, from about 5 to about 15 parts by weight of kyanite, from about 12 to about 27 parts by weight of bond clay, and from about 7¾ to about 11 parts by weight of water, the improvement which comprises a coating of from about 1 to about 8 percent by weigt based on the weight of said flint clay of finely divided alumina, said alumina being distributed substantially uniformly over the surface of said flint clay and bonded thereto.

8. In a plastic refractory composition consisting essentially of a substantially homogeneous mixture of flint clay, aluminum silicate, bond clay, and water sufficient to provide a moldable mass, the improvement comprising a coating of finely divided calcined alumina distributed substantially uniformly over the surface of said flint clay and constituting from about 1 to about 8 percent by weight of said flint clay.

9. A refractory slab consisting essentially of a plastic refractory of from about 50 to 70 parts by weight of flint clay, from about 5 to about 15 parts by weight of kyanite, from about 12 to about 27 parts by weight of bond clay, and about 3% by weight based on the weight of flint clay of a coating of alumina distributed substantially uniformly over said flint clay, the chemical composition of the flint clay and the alumina coated flint clay on a calcined basis by weight being typified by the following chemical analyses:

| | Parts by weight | |
|---|---|---|
| | Uncoated Flint Clay | Coated Flint Clay |
| Silica | 51.79 | 48.93 |
| Alumina | 44.27 | 47.30 |
| Titania | 2.67 | 2.56 |
| Ferric oxide | 0.73 | 0.70 |
| Calcium oxide | 0.05 | 0.05 |
| Magnesium oxide | 0.11 | 0.10 |
| Alkalies | 0.38 | 0.36 |

10. In the method of manufacturing a plastic refractory composition and including the steps of preparing a homogeneous mixture of flint clay, aluminum silicate, bond clay, and water to provide a moldable mass, the improvement which comprises the step of applying to said flint clay substantially uniformly over the surface thereof, prior to incorporation into said mass, a coating consisting essentially of alumina, the alumina coating constituting between about 1 and about 8 percent by weight of the flint clay.

11. In the method of manufacturing a plastic refractory composition and including the steps of preparing a substantially homogeneous mixture of particulate refractory materials including particles of flint clay as a principal component thereof, the improvement which comprises the step of applying to said particles of flint clay substantially uniformly over the surface thereof prior to incorporating said flint clay into said mixture of refractory materials a coating consisting essentially of alumina, the alumina coating constituting between about 1 and about 8 percent by weight of the total weight of said particles of flint clay.

References Cited by the Examiner

UNITED STATES PATENTS 2,870,032  1/1959  Jacobs _____ 106—67
2,949,704  8/1960  Jacobs _____ 106—67

TOBIAS E. LEVOW, *Primary Examiner.*

HELEN M. McCARTHY, *Examiner.*

J. E. POER, *Assistant Examiner.*